(12) United States Patent
Weng et al.

(10) Patent No.: US 7,423,412 B2
(45) Date of Patent: Sep. 9, 2008

(54) METHOD, APPARATUS AND COMPUTER PROGRAM PRODUCT FOR INJECTING CURRENT

(75) Inventors: Haiqing Weng, Shanghai (CN); Robert A. Seymour, Roanoke, VA (US); John D. D'Atre, Salem, VA (US); Allen M. Ritter, Roanoke, VA (US); Xiaoming Yuan, Shanghai (CN); Renchang Dai, Shanghai (CN); Robert W. Delmerico, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 221 days.

(21) Appl. No.: 11/344,730

(22) Filed: Jan. 31, 2006

(65) Prior Publication Data

US 2007/0177314 A1    Aug. 2, 2007

(51) Int. Cl.
*H02H 7/06* (2006.01)
*H02P 9/00* (2006.01)
*H02P 11/00* (2006.01)
*H02P 9/04* (2006.01)
*F02N 11/06* (2006.01)

(52) U.S. Cl. ..................... 322/20; 290/40 R
(58) Field of Classification Search ............... 322/20; 290/40 R
See application file for complete search history.

(56) References Cited

U.S. PATENT DOCUMENTS

| | | | | |
|---|---|---|---|---|
| 2,929,015 A | * | 3/1960 | Fleming | 323/230 |
| 3,569,785 A | * | 3/1971 | Durbeck et al. | 361/80 |
| 3,599,007 A | * | 8/1971 | Martin, Jr. | 307/87 |
| 3,898,439 A | * | 8/1975 | Reed et al. | 700/287 |
| 4,004,191 A | * | 1/1977 | Koroljuk et al. | 361/1 |
| 4,031,407 A | * | 6/1977 | Reed | 307/87 |
| 4,156,186 A | * | 5/1979 | Wolfinger | 324/108 |
| 4,308,463 A | * | 12/1981 | Giras et al. | 290/40 R |
| 4,333,119 A | * | 6/1982 | Schoenmeyr | 361/76 |
| 4,380,146 A | * | 4/1983 | Yannone et al. | 60/790 |
| 4,447,843 A | * | 5/1984 | Massey | 361/76 |
| 4,536,126 A | * | 8/1985 | Reuther | 290/40 R |
| 4,723,189 A | * | 2/1988 | Larsen et al. | 361/76 |
| 5,216,621 A | * | 6/1993 | Dickens | 702/58 |

(Continued)

OTHER PUBLICATIONS

Bolik, et al. "Vestas Handles Grid Requirements: Advanced Control Stradegy for Wind Turbines" Research and Development Department. Vestas Wind Systems A/S, E.F. Jacosensvej 7, DK-6950 Ringkobing. 5 pages. EWEC'03 European Wind Energy Conference & Exhibition. Madrid, Spain Jun. 16-19, 2003.

(Continued)

*Primary Examiner*—Julio Gonzalez
*Assistant Examiner*—Pedro J Cuevas
(74) *Attorney, Agent, or Firm*—Cantor Colburn LLP (57) ABSTRACT

Method and apparatus that provide a response to the negative sequence current demands during a disturbance of the grid system connected to power-generating equipment, such as a wind turbine system, provide for tracking components in the grid signal, orienting at least a portion of the signal, and injecting the oriented portion. Controlled injection of negative sequence current provides for extending small-signal control response, and also provides for modifications of the apparent impedance to the grid interconnect of the power conversion equipment.

20 Claims, 11 Drawing Sheets

U.S. PATENT DOCUMENTS

| | | | | |
|---|---|---|---|---|
| 5,225,712 | A * | 7/1993 | Erdman | 290/44 |
| 5,351,180 | A * | 9/1994 | Brennen et al. | 363/71 |
| 5,422,561 | A * | 6/1995 | Williams et al. | 323/209 |
| 5,581,470 | A * | 12/1996 | Pawloski | 702/61 |
| 5,594,659 | A * | 1/1997 | Schlueter | 700/286 |
| 5,610,834 | A * | 3/1997 | Schlueter | 700/293 |
| 5,621,305 | A * | 4/1997 | Clark et al. | 323/210 |
| 5,642,000 | A * | 6/1997 | Jean-Jumeau et al. | 307/31 |
| 5,734,257 | A * | 3/1998 | Schauder et al. | 323/207 |
| 5,737,016 | A * | 4/1998 | Ohzu et al. | 348/241 |
| 5,796,628 | A * | 8/1998 | Chiang et al. | 700/295 |
| 5,798,634 | A * | 8/1998 | Terada et al. | 323/207 |
| 6,043,569 | A * | 3/2000 | Ferguson | 307/105 |
| 6,104,171 | A * | 8/2000 | Dvorsky et al. | 322/8 |
| 6,137,776 | A * | 10/2000 | Bauerschmidt et al. | 370/216 |
| 6,201,715 | B1 * | 3/2001 | Huggett et al. | 363/48 |
| 6,492,801 | B1 * | 12/2002 | Sims et al. | 324/142 |
| 6,605,882 | B2 * | 8/2003 | Boudrias et al. | 307/105 |
| 6,628,005 | B2 * | 9/2003 | Nelson et al. | 290/40 C |
| 6,727,603 | B1 * | 4/2004 | McConnell et al. | 307/64 |
| 6,789,000 | B1 * | 9/2004 | Munson, Jr. | 700/287 |
| 6,862,199 | B2 * | 3/2005 | Escobar et al. | 363/41 |
| 6,912,252 | B2 * | 6/2005 | Emoto et al. | 375/240 |
| 6,924,628 | B2 * | 8/2005 | Thompson | 322/20 |
| 6,940,187 | B2 * | 9/2005 | Escobar et al. | 307/64 |
| 6,941,217 | B1 * | 9/2005 | Munson, Jr. | 701/100 |
| 6,972,972 | B2 * | 12/2005 | Duncan et al. | 363/56.01 |
| 6,998,811 | B2 * | 2/2006 | Myers et al. | 318/632 |
| 7,181,321 | B2 * | 2/2007 | Schlicker et al. | 700/297 |
| 7,190,149 | B2 * | 3/2007 | Huff et al. | 322/20 |
| 7,339,355 | B2 * | 3/2008 | Erdman et al. | 322/29 |
| 2003/0062774 | A1 * | 4/2003 | Escobar et al. | 307/64 |
| 2004/0024937 | A1 * | 2/2004 | Duncan et al. | 710/100 |
| 2004/0155620 | A1 * | 8/2004 | Myers et al. | 318/632 |
| 2007/0159265 | A1 * | 7/2007 | Weng et al. | 331/17 |
| 2007/0177314 | A1 * | 8/2007 | Weng et al. | 361/20 |
| 2007/0257561 | A1 * | 11/2007 | Karlsson et al. | 307/103 |
| 2008/0007121 | A1 * | 1/2008 | Erdman et al. | 307/47 |
| 2008/0018309 | A1 * | 1/2008 | Erdman et al. | 322/20 |
| 2008/0067981 | A1 * | 3/2008 | Inaba et al. | 322/20 |
| 2008/0073979 | A1 * | 3/2008 | Wiegman et al. | 307/84 |

OTHER PUBLICATIONS

Seman, et al. "Transient Analysis of Doubly Fed Wind Power Induction Generator Using Coupled Field-Circuit Model". Proceedings of ICEM 2004, Sep. 5-8, 2004, Cracow, Poland, 6 pages.

Dittrich, et al. "Comparison of Fault Ride-Through Strategies for Wind Turbines with DFIM Generators". Integral Drive Systems AG. 8 pages. EPE 2005.

Niiranen, Jouko. "Experiences on voltage dip ride through factory testing of synchronous and doubly fed generator drives". ABB OY Drives. 11 pages. EPE 2005.

* cited by examiner

METHOD, APPARATUS AND COMPUTER PROGRAM PRODUCT FOR INJECTING CURRENT

BACKGROUND OF THE INVENTION

The teachings herein relate generally to techniques for rapid compensation of phase and amplitude information in an electrical signal.

Many countries now require that wind turbines used as electric generation facilities stay connected with the electric grid when the grid is in fault. Remaining connected during system fault (often referred to as "low voltage ride through") can be challenging from an engineering perspective. Perhaps most importantly, the phase and amplitude information of the sequence components in the grid signal must be made available to the turbine control systems quickly and accurately. This permits the control systems to make timely adjustments to the wind turbine, thereby mitigating the effect of any large signal transients and thus prevent tripping of the wind turbine.

Generally, the primary goal of a power generation asset is to control positive sequence voltage. Traditional current regulated approaches implicitly attempt to eliminate the negative sequence current. For a wind turbine system using a Doubly Fed Induction Generator, in the presence of a load fault or imbalance condition, this requires a rotor side converter to support a negative sequence voltage and supply negative sequence current. Unfortunately, turbine systems may be limited in their ability to supply adequate negative sequence voltage, current or power. This leads to degradation of system controllability, and repeated operation of protection measures (e.g., a "crowbar circuit"), thus subjecting the generator and other turbine components to repeated transients. Dynamic brake resistors may be applied to shunt power from the DC bus, limiting activation of the crowbar and maintaining controllability.

Protection of a branch or feeder circuit coupled to the grid may depend upon the circuit having a low impedance characteristic for negative sequence voltages. That is, it may be expected that the branch circuit is capable of supplying some current to a negative sequence fault or imbalance condition. Typically, this depends upon the capacity of the grid to support the fault condition. Further, with various performance standards for generation assets, specifications for equipment in some instances may require negative sequence current in response to negative sequence voltage. Unfortunately, traditional current management schemes typically impede techniques for coordinated protection of branch and feeder circuits.

Traditional solutions to address these challenges have resulted in systems with non-linear behaviors, making it difficult to provide simple models of sub-system elements for use in full-system models. Design of experiments typically becomes quite complex, as exhaustive scenarios are needed to attempt to cover the locus of the non-linear system.

A number of resources have been directed to addressing or examining grid disturbance operation for generation assets. Examples include a technique described in the paper "Vestas Handles Grid Requirements" Advanced Control Strategy for Wind Turbines," by Bolik, et al. wherein numerous steps are taken, the first of which is disconnect the stator of the generator from the grid.

A second paper "Transient Analysis of Doubly Fed Wind Power Induction Generator Using Coupled Field-Circuit Model, by Seman et al. has examined aspects of grid faults. In the approach disclosed by Seman, the rotor side frequency converter is controlled by a modified direct torque control (DTC) control strategy.

A third paper "Comparison of Fault Ride—Through Strategies for Wind Turbines with DFIM Generators," by Dittrich, et al., compares various fault ride-through strategies.

A fourth paper "Experiences on Voltage Dip Ride Through Factory Testing of Synchronous and Doubly Fed Generator Drives," by Niiranen discloses techniques for fault emulation and measuring aspects related to system faults.

A number of the prior art techniques for responding to grid disturbances call for application of a crowbar circuit. Typically, when using this approach, the power generation equipment is unable to respond properly in light of new standards and demands for generation systems.

What is needed is a technique for maintaining a generation asset, such as a wind turbine, coupled to an electric grid during low voltage periods or periods of grid signal instability, wherein the technique coordinates the voltage, current and power capabilities in such a way as to account for positive and negative sequence grid conditions to extend small signal linearity and provide for reductions in self-protection transients.

BRIEF DESCRIPTION OF THE INVENTION

As presented in the above publications, the response of the system control to the imbalanced grid conditions led to application of the "crow bar" to the rotor circuit.

Disclosed is a method for modifying an effect of a disturbance in an electric grid on a generator coupled to the grid, the method including tracking at least a negative sequence component and a positive sequence component of a signal of the electric grid; orienting at least a portion of the magnitude of the negative sequence component for injecting into the electric grid; and, injecting the at least a portion into the electric grid to modify the disturbance.

Also disclosed is an apparatus for modifying an effect of a disturbance in an electric grid on a generator coupled to the grid, the apparatus having a controller for tracking at least a negative sequence component and a positive sequence component of a signal of the electric grid, orienting at least a portion of the magnitude of the negative sequence component for injecting into the electric grid; and, injecting the at least a portion into the electric grid to modify the disturbance.

Further disclosed is a computer program product stored on machine readable media, the product having the technical effect of instructions for modifying an effect of a disturbance in an electric grid on a generator coupled to the grid, by tracking at least a negative sequence component and a positive sequence component of a signal of the electric grid; orienting at least a portion of the magnitude of the negative sequence component for injecting into the electric grid; and, injecting the at least a portion into the electric grid to modify the disturbance.

The features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures, wherein.

DETAILED DESCRIPTION OF THE INVENTION

The teachings herein provide for determination of the levels of negative sequence voltage in a disturbance and, except for short transient crowbar circuit protections at initiation of the disturbance, a response that permits control of the positive and negative sequence currents flowing into the faulted condition. Limits on the positive and negative sequence current will depend on system parameters such as system conditions, system capability and topology of the converter equipment. The resultant control capability can be used to improve the response of the generator during asymmetric grid voltage conditions.

The teachings herein provide techniques for modifying the effects of a disturbance in an electric grid upon a generation asset (e.g., a wind turbine). The techniques for modifying the effect of the disturbance provide for maintaining a connection with the electric grid during a system fault, and providing appropriate behavior to the point of connection with the grid. One example of the system fault includes periods of low voltage in at least a portion of the electric grid. The imbalance in phase voltages caused by system faults typically results in negative sequence voltage and current conditions.

As discussed herein, the electric grid includes an electric signal that is a three-phase electric signal. However, it should be recognized that discussion of a three-phase input signal is for convenience and illustration purposes only, and not limiting of the teachings herein. For example, the teachings herein may be applied to other multi-phase or poly-phase input signals.

As used herein, the terms "disturbance," "grid disturbance," "fault," "system fault," "transient" and other similar terms generally refer to any event causing perturbations in the input signal from the electric grid. Examples of events that may cause a disturbance in the grid signal (e.g., a fault on an electric grid) are well known and not discussed further herein. In general and as discussed herein, the grid signal is considered to include a three-phase signal that includes sequence components having particular frequencies. Inevitably, as a variety of generating facilities contribute to the grid signal and as a variety of phenomena including transient events may occur, the sequence components of the grid signal may degrade or vary to some extent. For example, the sequence components may develop harmonic frequencies or phase shifts, either of which can complicate efficient operation of control systems and other aspects of grid performance. In general and as used herein, it is considered that the three-phase signal includes positive sequence components, negative sequence components and zero or neutral sequence components. Each of the components includes frequency information, phase information and magnitude information.

Stated another way, during a typical disturbance, the voltage in the phases become unbalanced. As an example, a line-to-line or two-phase short may exist, while the remaining phase maintains a system specified voltage. In such cases, the grid signal will have negative sequence components and positive sequence components.

The actual response of a generator control system to a given fault condition will depend on the objectives for operation of the generation system. For example, in order to assist in the clearing of the faulted lines, one proper response is to insert an ample amount of current (above normal levels) into the electric grid. This technique provides the protection devices carrying the fault current with a capability to clear at a protection point nearest the fault, thus reducing the unneeded action of a higher system or backup protection.

The teachings herein provide for minimizing disturbance and maintaining connection to the electric grid by controlling the voltage of the positive sequence and responding to the voltage of the negative sequence. That is, in a typical embodiment, the techniques herein provide for response to the negative sequence voltage in such a manner as to maintain small signal linearity, while employing a method that deliberately controls an amount of negative sequence current. The negative sequence current is transformed (or "oriented") and then "injected" into the electrical network. Current injection provides for control of the system to be maintained and reduces the harsh effects of transients upon system components. Further, this approach provides for linear characterization of system behavior and supports system design and analysis, providing for system operability and performance in response to a wide variety of scenarios and specifications.

As discussed herein, "small signal linearity" makes reference to use of a signal that is within the range of a regulator. That is, small signal linearity provides a signal that is within a signal range that permits the regulator to maintain design basis operation. Maintaining small signal linearity provides for continued operation of the systems as disclosed herein, and prevents activation of protection measures, such as actuation of the crowbar circuit 410.

Furthermore, use of current injection (also referred to as "current compensation") is supportive of various branch circuit protection and voltage compensation schemes. This is vital to the design of a robust generation system, as the rules applied in branch circuit protection and voltage support are widely distributed and understood in the art. In order to allow for a multiplicity of diverse power producers to exist on a single grid, aspects of current injection can be controlled and made to conform to various standards and equipment specifications.

Figure 1:
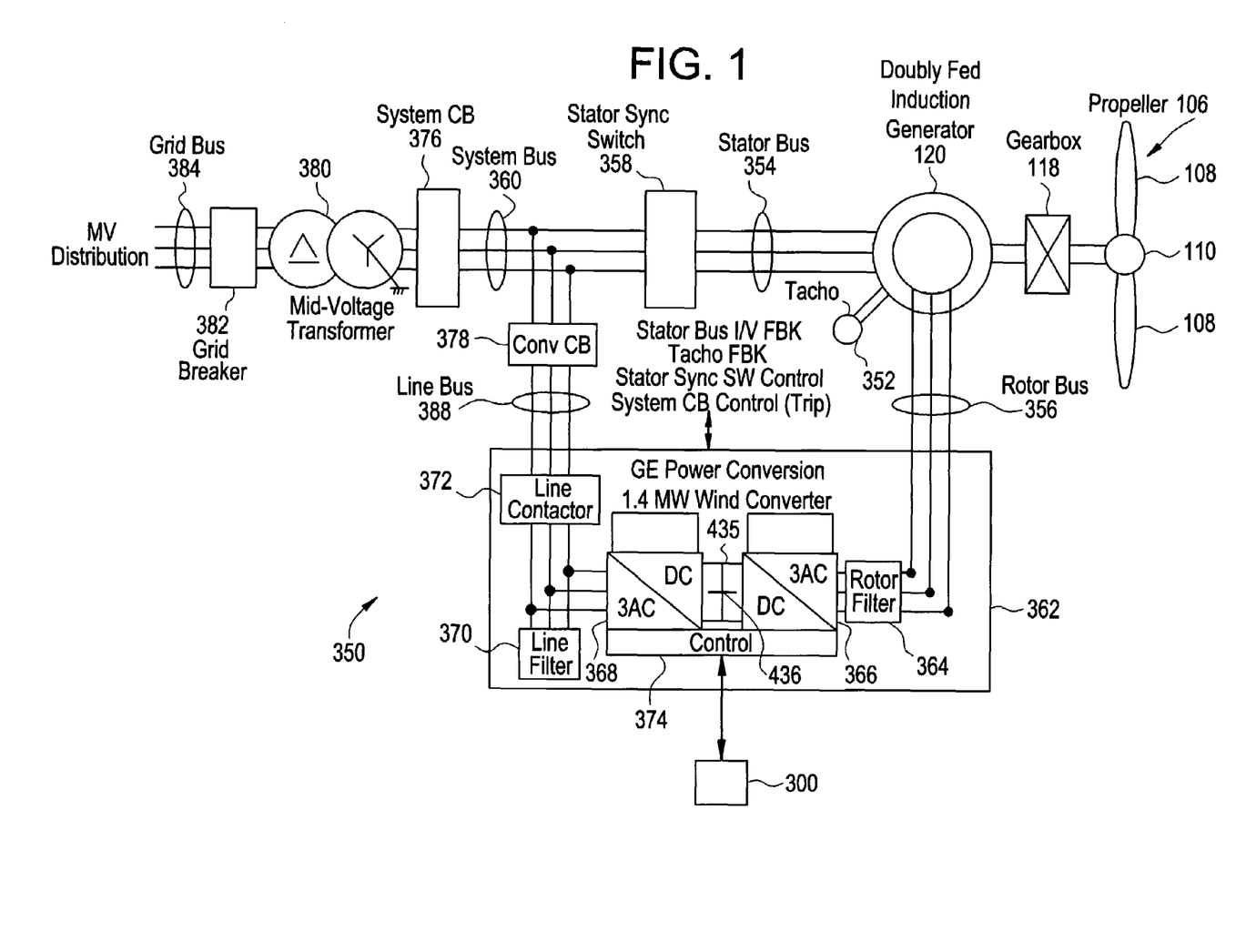
FIG. 1 depicts aspects of a control system for a wind turbine.

In order to place the teachings of the current invention into context, a review of aspects of components for generating electricity using a wind turbine are now discussed. Referring to FIG. 1, there is shown an exemplary embodiment of aspects of wind turbine systems 350.

In this embodiment, a rotor 106 includes a plurality of rotor blades 108 coupled to a rotating hub 110, and together define a propeller (e.g., a thirty meter propeller). The propeller is coupled to a gear box 118, which is, in turn, coupled to a generator 120. In this embodiment, the generator 120 is a doubly fed induction generator 120 (also known in the art as a "wound rotor" and referred to herein as a "DFIG 120"). A tachometer 352 is also coupled to the generator 120 and provides for monitoring of the speed of the generator 120.

The generator 120 is typically coupled to a stator-synchronizing switch 358 via a stator bus 354 and is also coupled to a power conversion component 362 via a rotor bus 356. The stator bus 354 provides output of three-phase power from a stator (not shown) of the generator 120 and the rotor bus 356 provides output of three-phase power from a rotor (not shown) of the generator 120. The stator-synchronizing switch 358 is connected to a system circuit breaker 376 via a system bus 360. With particular reference to the power conversion component 362, the generator 120 is coupled to a rotor filter 364 via the rotor bus 356. The rotor filter 364 is coupled to a rotor side converter 366. The rotor side converter 366 is coupled to a line side converter 368 typically, which is also coupled to both a line filter 370 and a line contactor 372. In exemplary embodiments, the rotor side converter 366 and the line side converter 368 are configured for a normal operating mode in a three-phase, two level, Pulse Width Modulation (PWM) arrangement using Insulated Gate Bipolar Transistor (IGBT) switching devices (not shown). The rotor side converter 366 and the line side converter 368 are coupled via a DC link 435 across which is the DC link capacitor 436.

The power conversion component 362 also includes a controller 374 to control the operation of the rotor side converter 366 and the line side converter 368, and as described in more detail herein. It should be noted that the controller 374, in typical embodiments, is configured as an interface between the power conversion component 362 and a control system 300. It further should be noted that when reference is made herein to a "bus," this refers to any communication or transmission link that includes one or more conductors or lines that define or form an electrical, communication or other type of path.

In typical embodiments, the line contactor 372 is coupled to a conversion circuit breaker 378 via a line bus 388. The conversion circuit breaker 378 is also coupled to the system circuit breaker 376 via the system bus 360. It should be noted that the output lines of the conversion circuit breaker 378 and the lines of the system bus 360 may be coupled in any manner known in the art, including by wiring corresponding lines together (e.g., corresponding power phase lines) using a current summation technique.

The system circuit breaker 376 is coupled to a transformer 380, which is connected to a grid breaker 382. The grid breaker 382 is connected to a mid-voltage distribution portion via a grid bus 384.

In operation, power generated at the generator 120 by the rotating rotor 106 is provided via a dual path to a power grid. The dual paths are defined by the stator bus 354 and the rotor bus 356. On the rotor bus 356 side, sinusoidal three-phase alternating current (AC) power is converted to direct current (DC) power by the power conversion component 362. The rotor filter 364 is typically used to compensate or adjust for the rate of change of the rotor side converter 366 PWM signals and the line filter 370 is used to compensate or adjust for harmonic currents in the line side converter 368 PWM signals. The converted power from the power conversion component 362 is combined with the power from the stator of the generator 120 to provide three-phase power having a frequency that is maintained substantially constant, for example, at a sixty Hertz AC level. The power conversion component 362 compensates or adjusts the frequency of the three-phase power from the rotor of the generator 120 for changes. An obvious example being changes in the rotational speed of the hub 110. It should be noted that the stator synchronizing switch 358 synchronizes the three-phase power from the stator of the generator 120, which is combined with the three-phase power output from the power conversion component 362.

The circuit breakers within the wind turbine system 350, including the conversion circuit breaker 378, system circuit breaker 376 and grid breaker 382 are configured to disconnect corresponding buses, for example, when current flow is excessive and can damage the components of the wind turbine system 350. Additional protection components are also provided, including the line contactor 372, which may provide disconnects by opening a switch (not shown) for each of the lines of the line bus 388.

It should be noted that the wind turbine system 350 may be modified to operate in connection with different power systems, etc. In general, the wind turbine system 350 generates power as is known in the art. It should also be recognized that aspects of wind turbine systems 350 as discussed herein are merely illustrative and not limiting thereof.

In various embodiments, the power conversion component 362 receives control signals from, for example, the control system 300 via the controller 374. The control signals are based, among other things, on sensed conditions or operating characteristics of the wind turbine system 350 as described herein. Typically, the control signals provide for control of the operation of the power conversion component 362. For example, feedback from the tachometer 352 in the form of sensed speed of the generator 120 may be used to control the conversion of the output power from the rotor bus 356 to maintain a proper and balanced three-phase power supply. Other feedback from other sensors also may be used by the control system 300 to control the power conversion component 362, including, for example, stator and rotor bus voltages and current feedbacks. Using the various forms of feedback information, and for example, switching control signals, stator synchronizing switch control signals and system circuit breaker control (trip) signals may be generated in any known manner.

Figure 2:
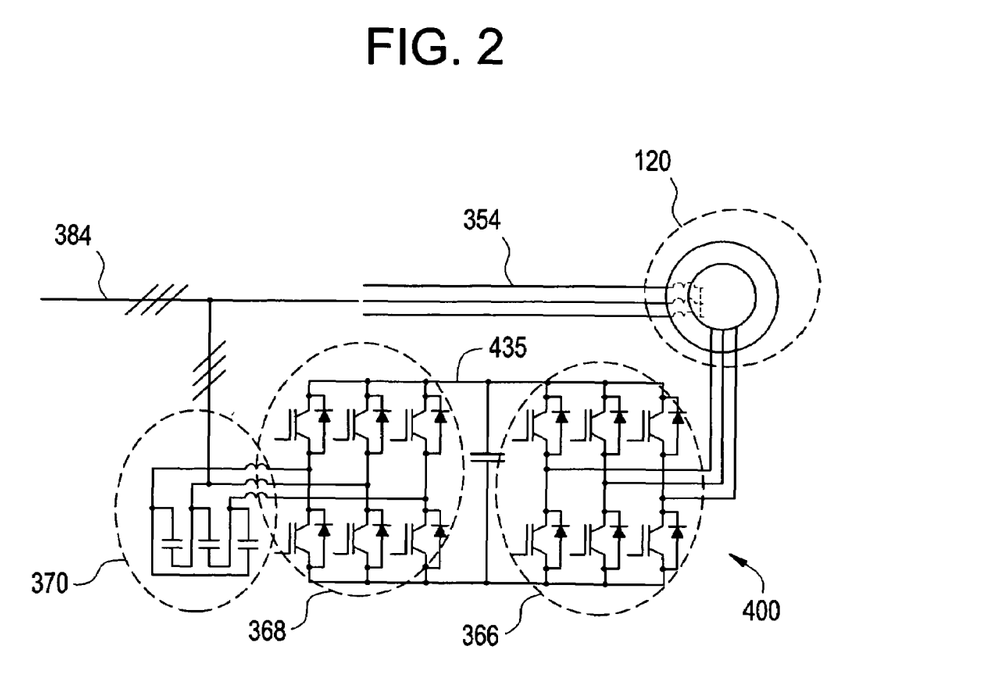
FIG. 2 depicts an exemplary topology for a doubly fed induction generator (DFIG)

Referring to FIG. 2, there are shown aspects of a typical topology 400 for the double fed induction generator (DFIG) 120 used in electric generation with wind turbines. The control system 300 typically measures the voltage, current, speed, and position of the rotor 106, and provides for control of the switching of both the rotor side converter 366 and the line side converter 368.

Figure 3:
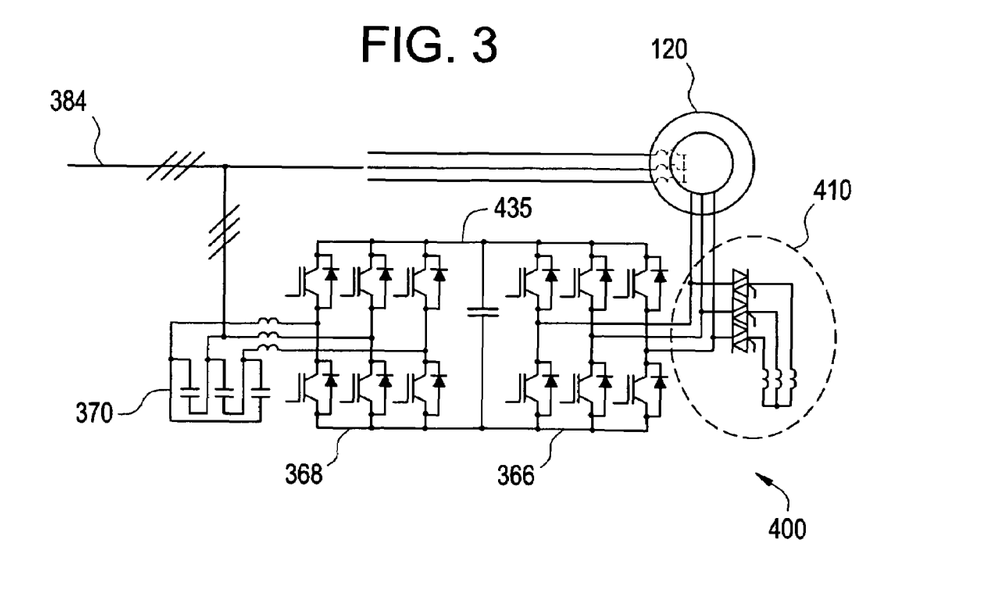
FIG. 3 depicts an exemplary topology for a DFIG having a crowbar circuit.

Referring to FIG. 3, there are shown aspects of the typical topology 400, wherein a system protection feature, referred to as a crowbar circuit 410 is included. In typical embodiments, the crowbar circuit 410 is a fully controllable short circuit device. In other embodiments, the crowbar is accomplished by a control action of the rotor-side converter 366. In these embodiments, the rotor-side converter 366 is typically configured to limit crowbar circuit actuations once control is re-established.

As the wind turbine system 350 is sensitive to disturbances in the grid, and as grid performance requirements typically require that wind turbine systems 350 remain connected to the grid 384 during each disturbance (i.e. to meet low voltage ride through (LVRT) requirements), crowbar circuits 410 have typically been used as a protection measure. One embodiment of the crowbar circuit 410 is illustrated in FIG. 3. In some other embodiments, the crowbar circuit 410 is integrated with the rotor-side converter 366. Regardless of where the crowbar circuit 410 resides or the configuration of the crowbar circuit 410, when the crowbar circuit 410 is active it will protect the rotor side converter 366 by preventing large current flowing into DC capacitors 436. When the crowbar circuit 410 is active, the rotor side converter 366 is prevented from control of the DFIG 120.

Figure 4:
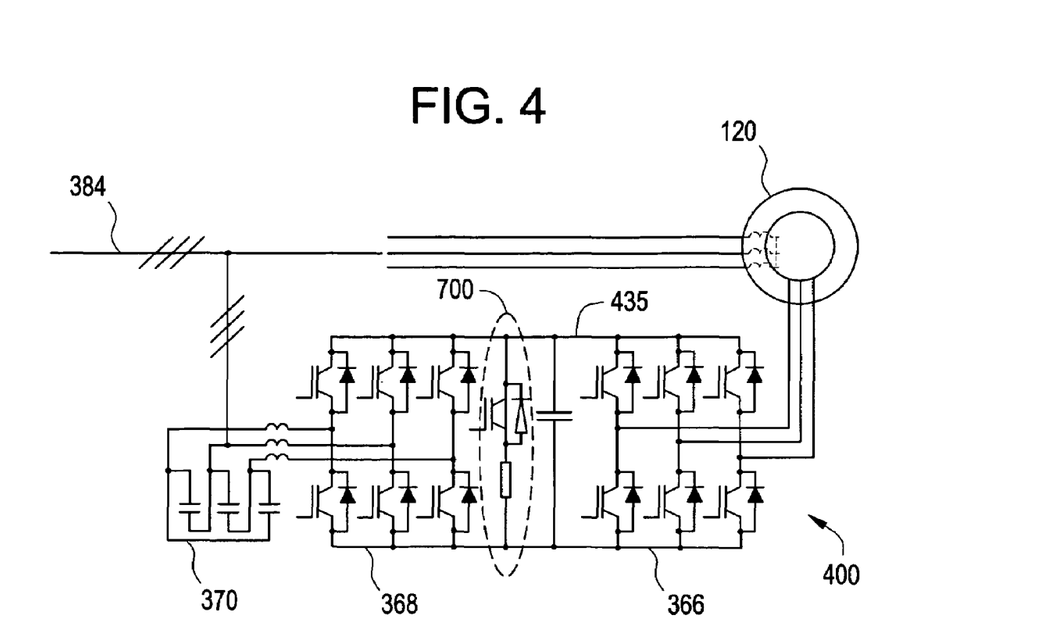
FIG. 4 depicts an exemplary topology for a DFIG having a dynamic brake.

Referring to FIG. 4, there are shown aspects of the typical topology 400, wherein another system protection feature, a dynamic brake 700 assembly is included. In this embodiment, the dynamic brake 700 is included across the DC bus 435. In typical embodiments, the dynamic brake 700 includes a fully controllable short circuit device placed in series with a resistor. The dynamic brake 700 typically prevents the DC bus 435 from over voltage and thus protects the rotor side converter 366 and the line side converter 368. By use of the dynamic brake 700, the crowbar circuit 410 activates less frequently, so the controllability of the rotor-side converter 366 during the grid disturbance is improved. Further, in a second approach, and through use of the dynamic brake 700 with a sufficiently-large power rating, the crowbar circuit 410 can be eliminated or modified. This second approach, however, will typically require a design for the dynamic brake 700 that calls for a costly and bulky implementation thereof. One skilled in the art will recognize that this problem can be addressed in accordance with the teachings herein, which can be called upon to reduce the capacity of the dynamic brake 700 and activation of the crowbar circuit 410.

When the grid 384 has an asymmetric fault, the crowbar circuit 410 will frequently activate, thus the DFIG 120 is frequently not controlled. This problem makes it very difficult to control active power and reactive power to the grid 384 during the fault situation. This problem can be addressed in accordance with the teachings herein, which provide for current compensation.

Figure 5:
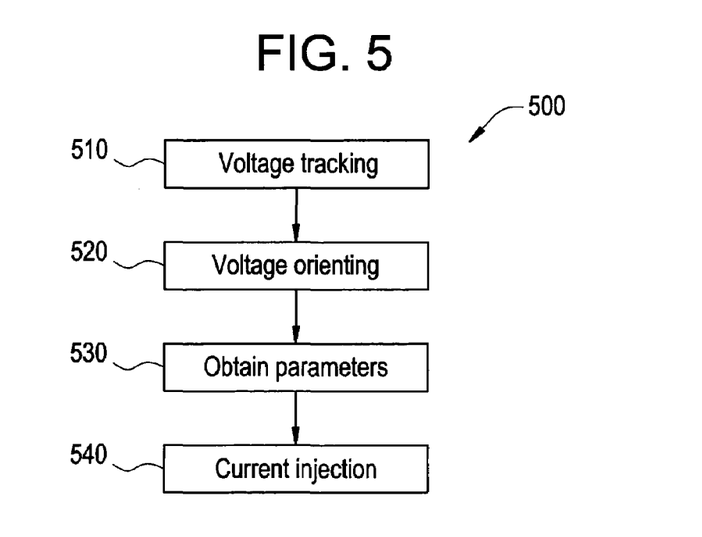
FIG. 5 is a flow chart depicting an exemplary process for current compensation.

Current compensation 500 may generally be described as involving three stages, depicted in FIG. 5. In a first stage, positive phase sequence voltage signals and negative phase sequence voltage signals and the voltage of the DC Link 435 are tracked. Among other things, voltage tracking 510 provides for modeling of the negative phase sequence voltage that cannot be accommodated for a given operating condition. In a second stage, transforming excess negative phase sequence voltage signal into a rotor current signal occurs, and orientation of the negative phase sequence voltage for application to XY regulators within the controller 374 takes place. After voltage orienting 520, current compensation 500 calls for applying the oriented signal at the error junction to the XY current regulator within the controller 374, effectively adjusting the feedback and compensating for some of the signal of the grid disturbance.

Prior to current injection 540 and typically (but not necessarily) after voltage orienting 520, obtaining system parameters 530 is completed. Exemplary system parameters include parameters such as system conditions, system capability and topology. Knowledge of the system parameters provides for determination of constraints, limitations, and objectives for injection of current in a manner that will address user objectives. In this manner, at least a portion of the negative sequence component magnitude may be used for injection, wherein the at least a portion is within a predetermined range. In typical embodiments, the predetermined range accounts for the various system parameters and an objective for maintaining small signal linearity.

Current injection 540 minimizes the impact of the grid disturbance upon the rotor converter control, reducing the activation frequency of system protection features such as the crowbar circuit 410, as well as the required capacity for the dynamic brake 700. Thus, low voltage ride through of the wind turbine system 350 is supported.

Figure 6:
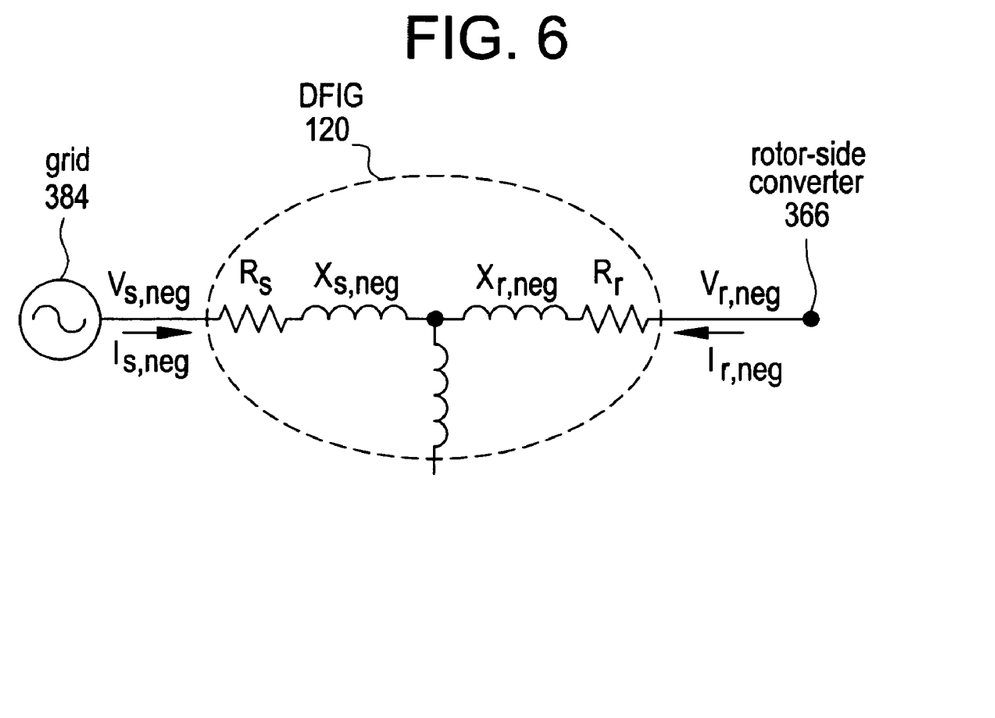
FIG. 6 depicts signal inputs to the DFIG.

Referring to FIG. 6, a relationship of power sources is depicted. In FIG. 6, the grid bus 384 supplies a negative sequence grid voltage signal ($V_{s,neg}$) and a negative sequence grid current signal ($I_{s,neg}$) to the DFIG 120. Similarly, the rotor side converter 366 supplies a negative sequence rotor voltage signal ($V_{r,neg}$) and a negative sequence rotor current signal ($I_{r,neg}$) to the DFIG 120. These terms are also used in FIG. 7.

Figure 7:
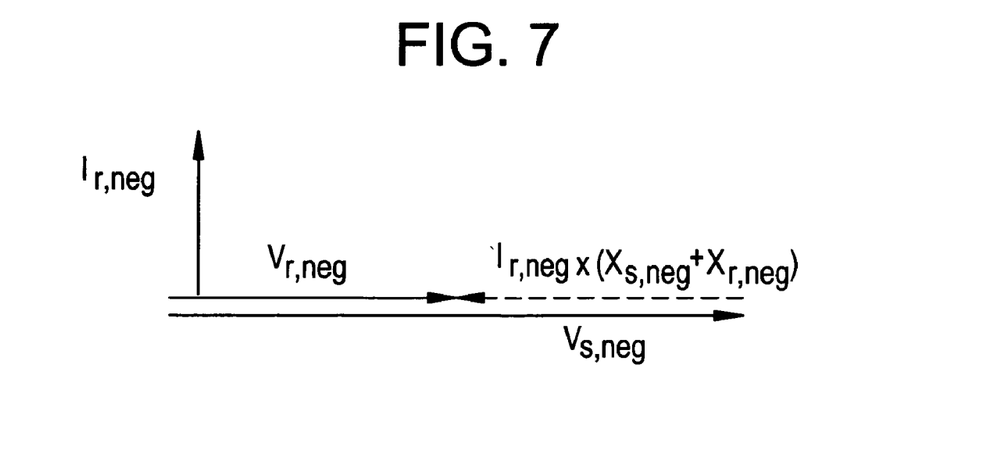
FIG. 7 depicts relationships of negative sequence components.

In FIG. 7, a variation on the relations of FIG. 6, aspects of the negative sequence voltages within the wind turbine system 350 are depicted. In addition to the variables established in FIG. 6, the sum ($X_{s,neg}+X_{r,neg}$) represents the negative sequence impedance for the DFIG 120. FIG. 7 shows that, by injecting additional negative sequence current into the DFIG 120, the required negative sequence voltage for the rotor-side converter 366 can be reduced. This is significant since the rotor-side converter 366 has limited capability to support both positive and negative sequence voltage. Reducing negative sequence voltage enables additional positive sequence voltage to be applied to the electric grid 384. Thus, it is possible to enhance control of the positive sequence current and to control the positive sequence real and reactive power.

When injecting negative sequence current into the DFIG 120, the current $I_{r,neg}$ typically includes a 90-degree phase leading the negative sequence voltage of the grid 384 with respect to the positive sequence rotation direction. Leading the negative sequence voltage of the grid 384 provides for a consuming negative sequence reactive power. By use of various tools not discussed herein, it is possible to measure the magnitude and phase of both the positive sequence voltage and the negative sequence voltage in the signal of the grid 384. Once these quantities are known, the proper phase and magnitude for orienting at least a portion of the magnitude of the negative sequence component for injection into the electric grid 384 can be determined.

In order to discuss this in more depth, or from another approach, certain conventions are now adopted and considered useful for discussing aspects of the various signals. As used herein, an "instrument signal" voltage ($V_{signal}$) includes the positive sequence voltage, the negative sequence voltage, and the phase angle for each of the positive sequence components and the negative sequence components; voltage ($V_{need}$) refers to the measured negative sequence voltage magnitude; voltage ($V_{allowed}$) refers to voltage headroom left after the positive sequence voltage has been satisfied; voltage ($V_{shortfall}$) refers to the un-supportable negative sequence voltage magnitude; current ($I_{comp}$) refers to the compensation current associated with the shortfall voltage and available for current injection 530; while current ($I_{compXY}$) refers to the sequence components of the comp that are apportioned and rotated, where current ($I_{compXY}$) is added to the current regulator error nodes.

Figure 8:
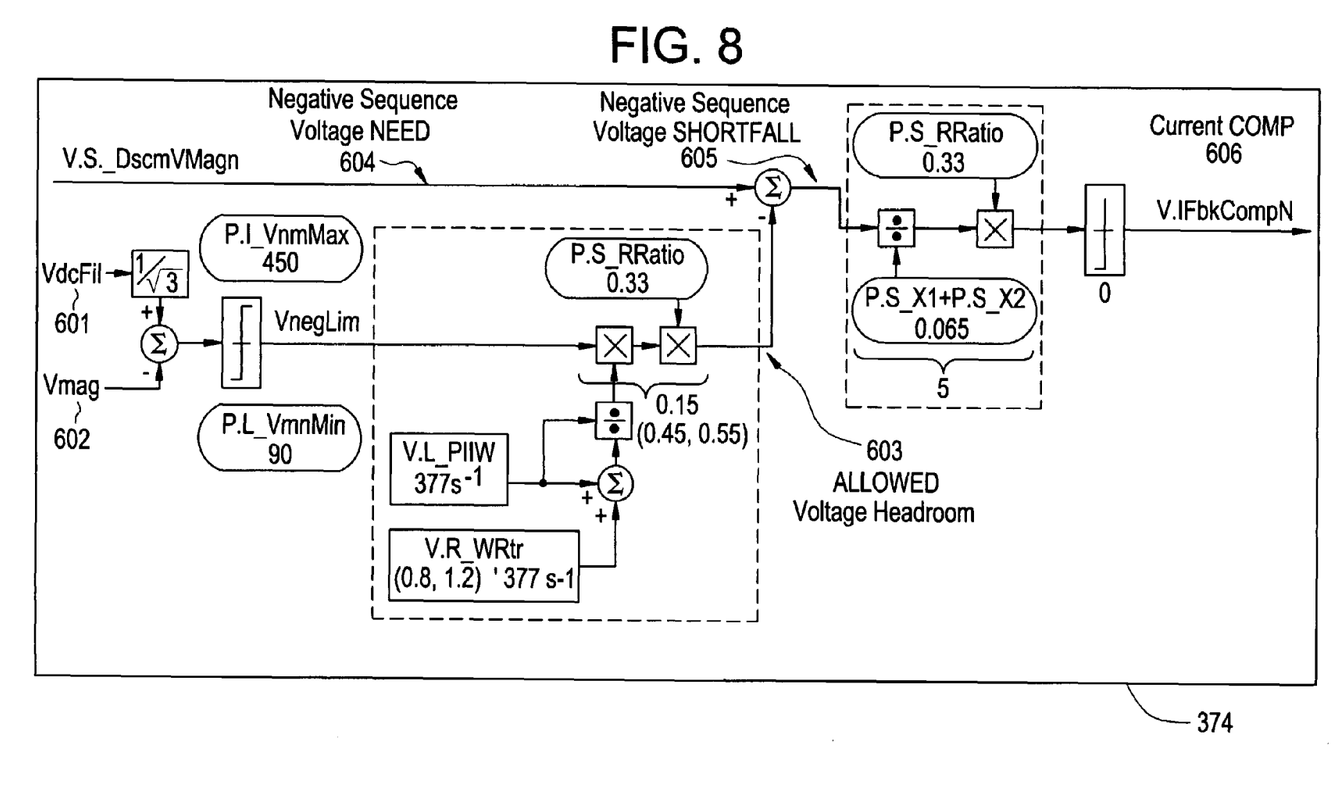
FIG. 8 is a block diagram depicting aspects of signal analysis and determination of compensation current.

Referring to FIG. 8, aspects of current compensation 500 and signal analysis are shown. In FIG. 8, an input signal is evaluated, typically in the controller 374. Typically, a difference between the DC link voltage 601 and the positive sequence voltage magnitude 602 is determined to define an allowed voltage margin ($V_{allowed}$) 603 available to support harmonic voltages (and the compensation thereof). Assuming that transformations between the stator circuits and the rotor circuits are properly handled, the difference between the actual negative sequence voltage need ($V_{need}$) 604 and allowed voltage margin ($V_{allowed}$) 603 (that is clamped to positive values) defines the amount of shortfall voltage ($V_{shortfall}$) 605, or the negative sequence voltage that cannot be accommodated. The net impedance, expressed as a reactance, is used to convert the shortfall voltage ($V_{shortfall}$) 605 into a current magnitude thus providing for a compensation current signal 606, (or simply, compensation current 606).

Figure 9:
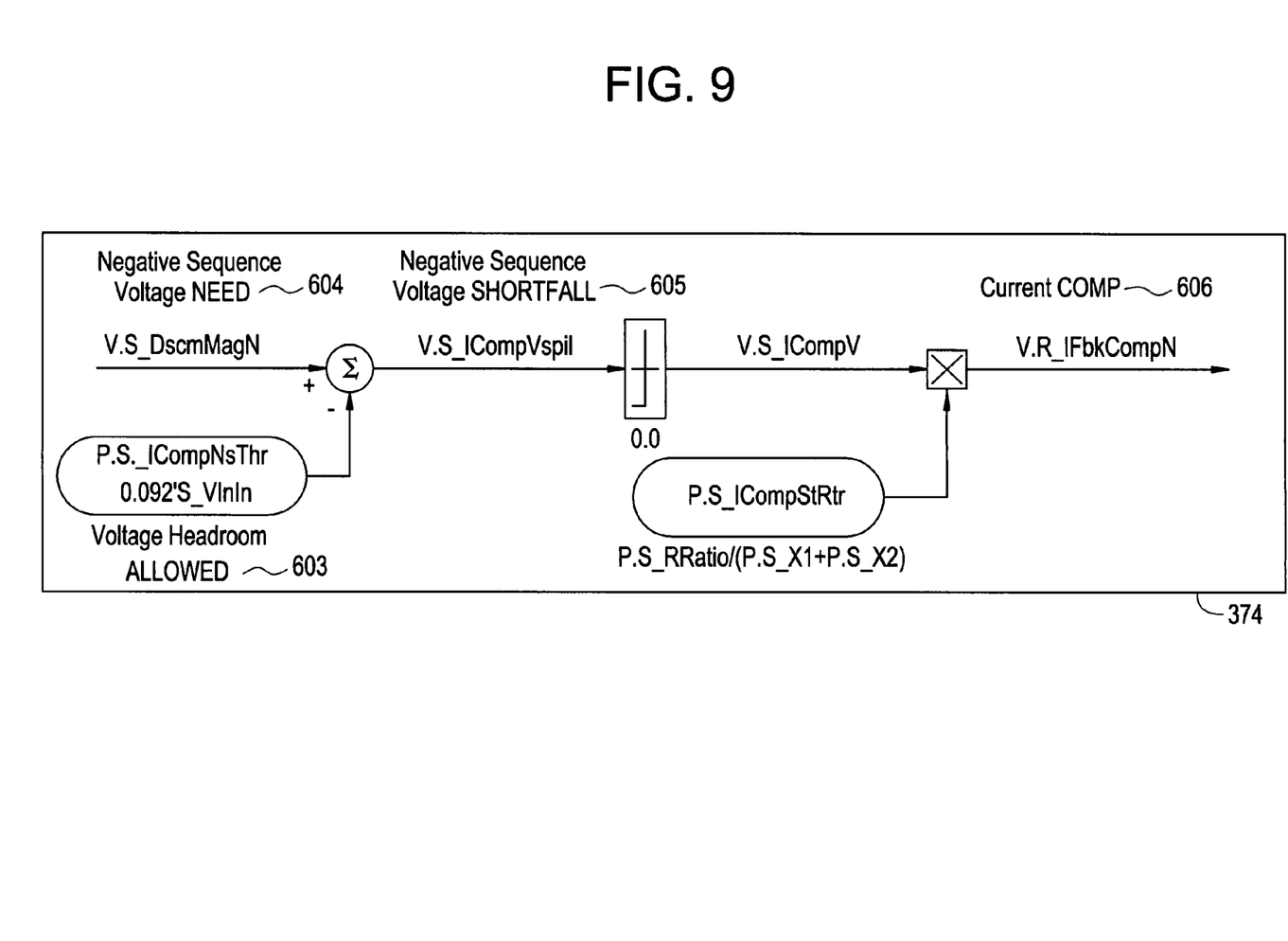
FIG. 9 is another embodiment for determining aspects of signal analysis and determination of compensation current.

Referring to FIG. 9, another embodiment of signal analysis for current compensation 500 is shown. FIG. 9 depicts an embodiment for processing that is considered an approximation of the embodiment depicted in FIG. 8. As is the case with the embodiment depicted in FIG. 8, a processing unit, typically the controller 374, provides for determination of the voltage need 604, the allowed voltage 603, and determines the shortfall voltage 605. The shortfall voltage 605 is converted into compensation current 606.

In either embodiment, the compensation current signal 606 (a scalar quantity) must be allocated between the X-axis and the Y-axis in the negative sequence frame of reference. The resultant vector must further be re-oriented to the positive sequence frame of reference. These X-axis and Y-axis components are added to error junctions of the X-Y current regulator following the re-orienting stage.

Figure 10:
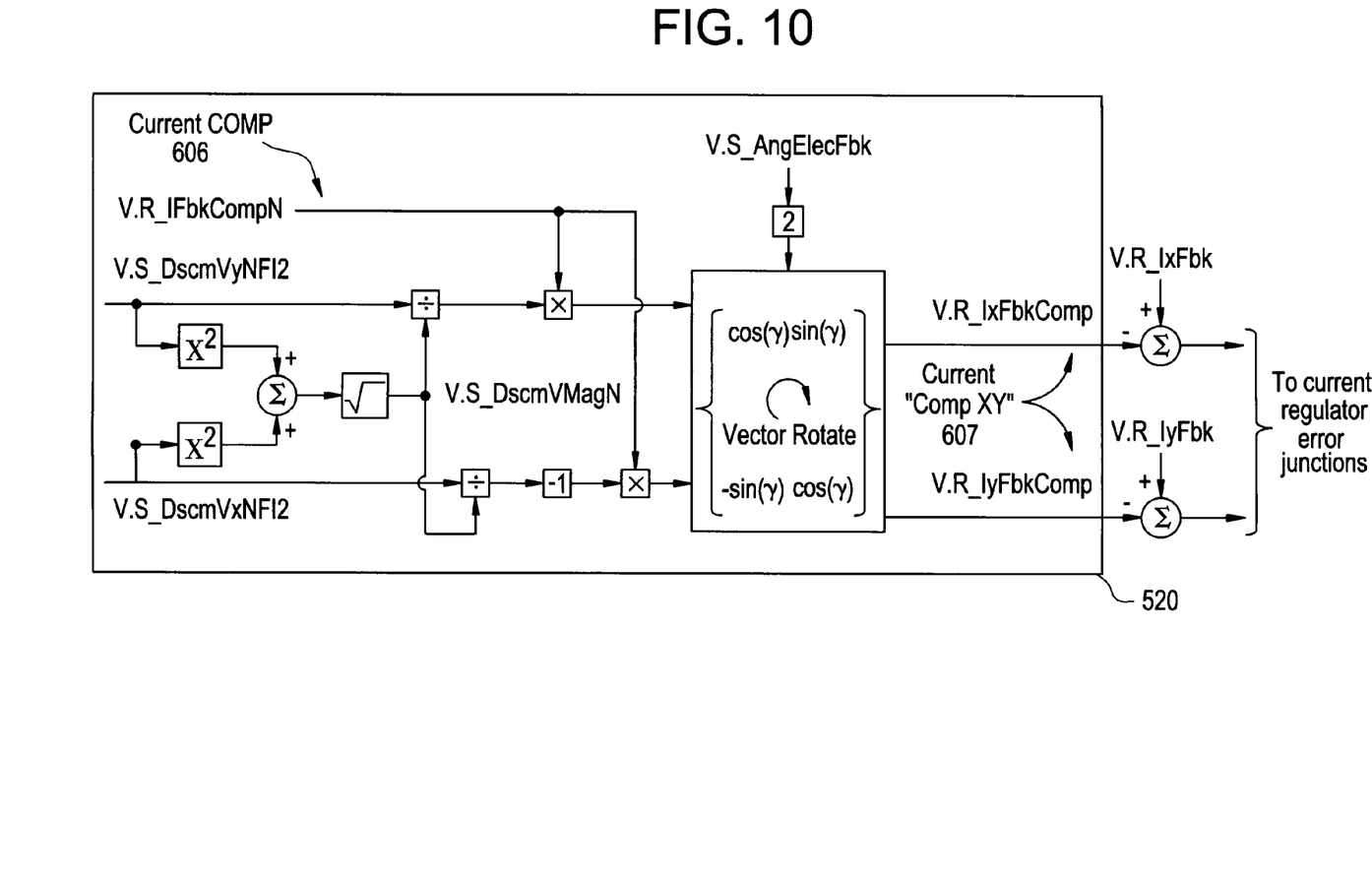
FIG. 10 is a block diagram depicting aspects of manipulations to the compensation current for use as injection current.

FIG. 10 depicts aspects of the stage of voltage orienting 520. In FIG. 10, the compensation current 606 is apportioned and rotated for adding the appropriate contributions to the current regulator error nodes as the pair of signals (comp XY), 607.

In a further embodiment (not shown), the negative sequence injection current (comp XY 607) is determined by detecting the saturation status of a regulator designed to control the negative sequence current. The detector (not shown) can be used to modify the value of a scalar compensation term, which is then apportioned and rotated in a manner similar to the embodiment described above with reference to FIG. 10. With this approach, comp XY 607 can be regulated to maintain linearity of the current regulators.

Figure 11:
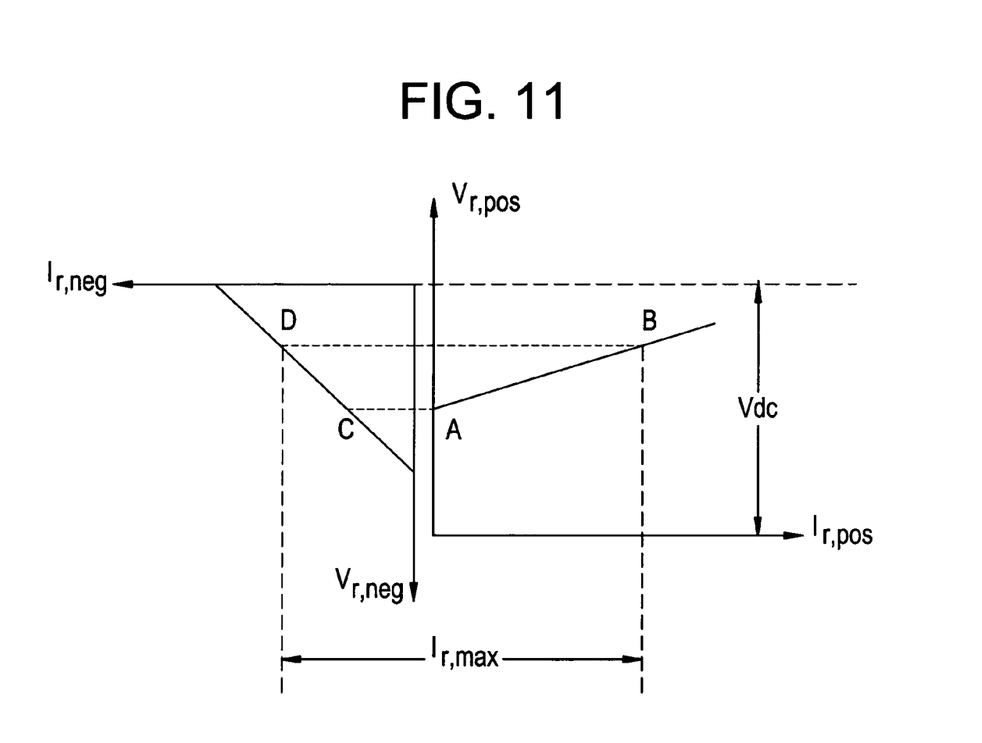
FIG. 11 depicts aspects of capacity for injecting negative sequence current and positive sequence active and reactive current.

Increasing the injected negative sequence current ($I_{r,neg}$) will reduce the required converter negative sequence voltage ($V_{r,neg}$), as shown in FIG. 11. This reduction is depicted as being from C to D. Accordingly, the available converter positive sequence voltage ($V_{r,pos}$) is increased from A to B. As the capability of the system to control positive sequence current ($I_{r,pos}$) is increased from A to B, so is the capability to inject positive sequence active power as well as positive sequence reactive power.

The total current, including both negative sequence current ($I_{r,neg}$) and positive sequence current ($I_{r,pos}$) should not exceed the total current capacity $I_{r,max}$, of the rotor-side converter 366 (shown as between B and D). Since the total current capacity $I_{r,max}$ of the rotor-side converter 366 is known, one can calculate the maximum negative sequence current (point D) and positive sequence active/reactive current (point B) that the system 350 can inject into grid. Also, the minimum negative sequence current (point C) that the converter must inject to make the system fully controllable is determined when the positive sequence current $I_{r,pos}$ is zero (point A). Accordingly, the maximum (point D) and the minimum (point C) will define a capability range for the system 350.

Figure 12:
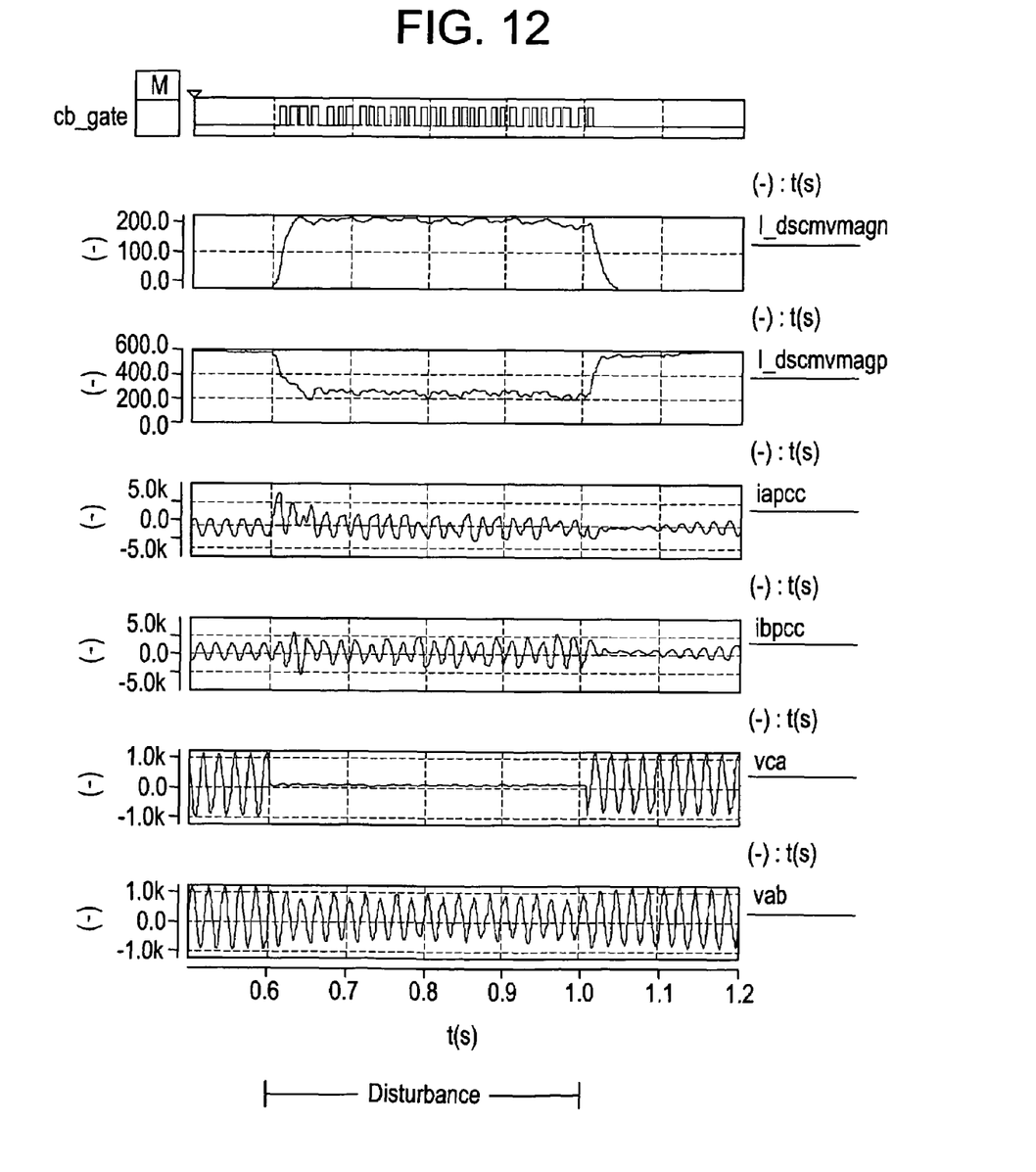
FIG. 12 depicts response of a prior art wind turbine to a simulated transient event.
Figure 13:
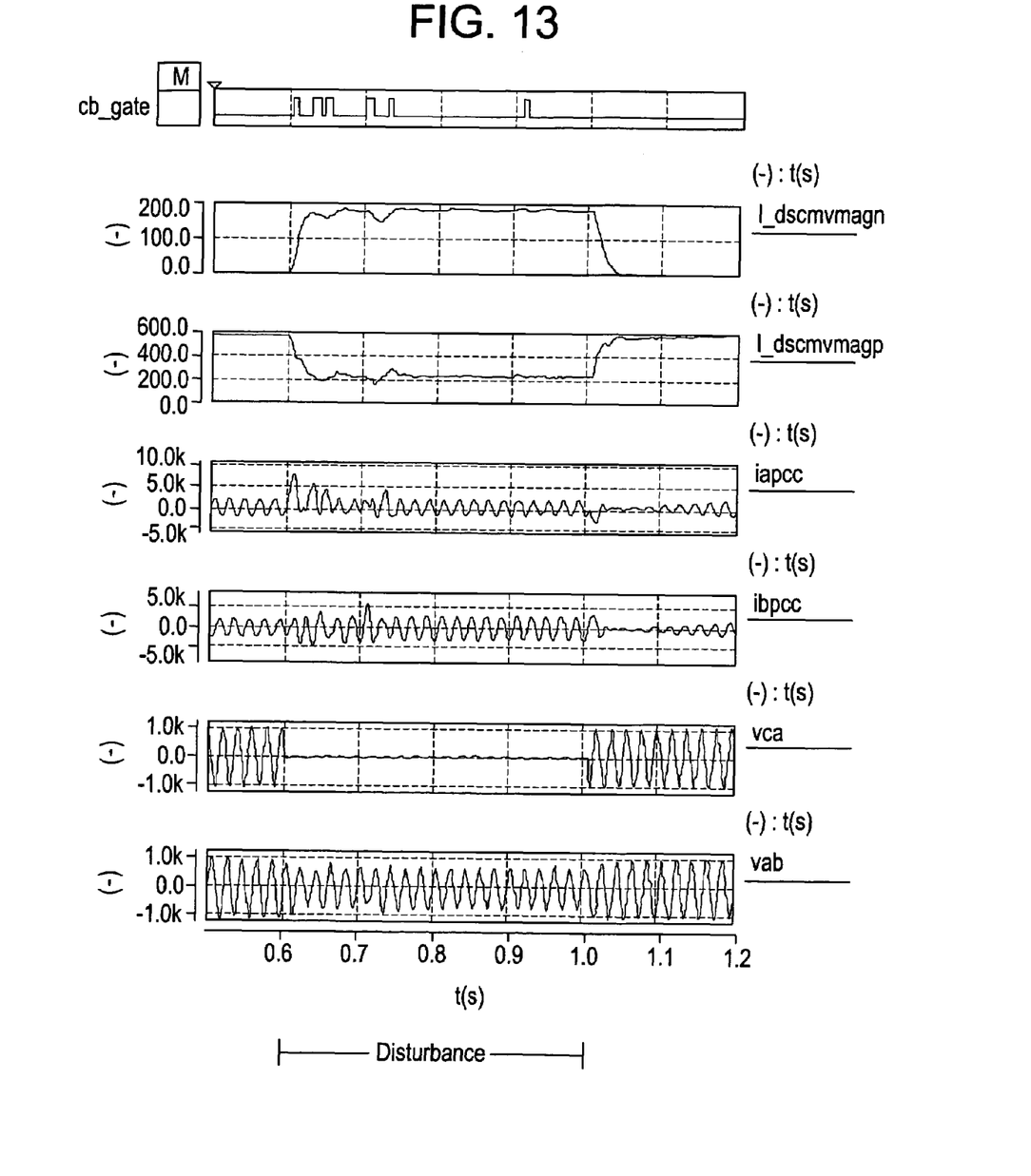
FIG. 13 depicts response of a wind turbine making use of the teachings herein to the simulated transient event; and, FIG. 14 depicts an exemplary topology for a full-power conversion synchronous machine system.

One benefit provided by the teachings herein is a technique to reduce the current in the rotor-side converter 366. Refer to the method illustrated in FIG. 9. Another benefit is to provide for a greater variety of conditions under which active/reactive power command from an upper level controller (e.g., turbine controller or wind farm controller) can be followed. A further benefit is an increased capability to inject active power into grid, or increase reactive power injection to grid. Consequently, a generation system making use of the teachings herein is equipped to more-closely emulate the behavior of traditional synchronous generators during grid transients and negative sequence voltage events In an evaluation of the foregoing embodiments, simulations were performed. Two separate depictions are provided. First, in FIG. 12, response to a simulated transient is depicted. In FIG. 13, aspects of the same simulated event are depicted. However, in FIG. 13 performance was improved in accordance with the teachings herein. Note, that in reference to FIG. 12 and FIG. 13, the signals presented in simulation charts are denoted as follows: "Cb_gate" refers to a crowbar event gate signal; "l_dscmvmagn" and "l_dscmvmagp" are signals of the negative and positive voltage levels; "Iapcc" and "Ibpcc" indicate the converter currents at the point of common connection (pcc). The line-to-line fault was applied between phase A and phase C on the grid-side of the transformer 380. "Vca" and "Vab" indicate line to line voltage at the pcc.

The simulated transient event (where phase a and phase c are short circuited) is a line-to-line disturbance with signal degradation to 0 Volts. The short circuit was applied at 0.6 seconds and removed at 1.0 second.

Referring to FIG. 12, results for a prior art wind turbine system 350 are depicted. In FIG. 12, the wind turbine system 350 experiences multiple and ongoing actuations of "crowbar events", accomplished by control action of the rotor-side converter 366. The crowbar events continue throughout the duration of the grid disturbance. Referring to FIG. 13, quieting of the crowbar event gate signal (Cb_Gate) provides an indication that system regulators are in control. After a few crowbar actuations the controller 374 regained current control and regulated the system to the desired levels. Note that control was regained within a comparatively short interval.

The above description is focused on injecting positive sequence active power and reactive power into the grid. However, one skilled in the art will recognize that this invention also applies to absorbing positive sequence active power and reactive power from the grid 384 when required. With the help of injecting negative sequence current into the grid 384, the system 350 is equipped to control the absorbed active and reactive power according to the needs of a user.

Note that the above description relies upon embodiments using the DFIG 120. However, one skilled in the art will recognize that the teachings herein may also be applied to full power conversion systems, as shown in FIG. 14.

Figure 14:
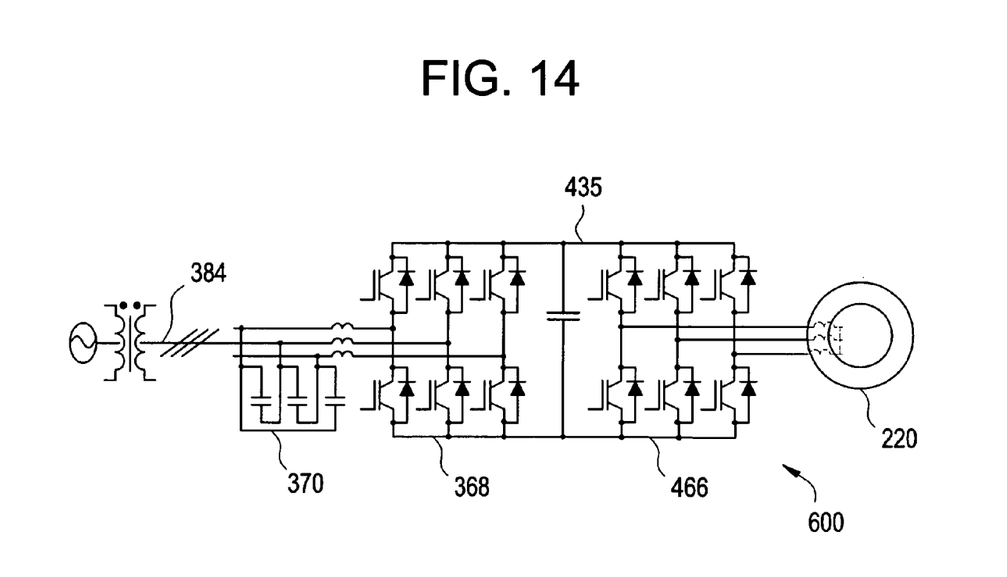

In FIG. 14, a full power conversion system topology 600 is shown. The full power conversion system topology 600 includes a production side converter 466 and a line side converter 368. The production side converter 466 and the line side converter 368 are coupled via the DC bus 435. Feeding the production side converter 466 is a full power generator 220. It should be recognized that the line side converter 368, connected to the grid via transformer, is similar in many regards to the rotor-side converter 366, connected to the grid via DFIG 120. This is especially relevant in terms of capability to inject current into the grid, and aspects thereof may be interchangeable. Accordingly, these exemplary converters are not limiting of the teachings herein.

Other components as described above or as known in the art may be included. For example, in this illustration, the filter 370 is also included.

Typically, in this embodiment, the teachings herein are implemented only for the line-side converter 368. Injection of the negative sequence current by the line-side converter 368 into the grid 384 will increase capability of the full power generator to control the positive sequence current. Accordingly, the capability to inject positive sequence active power or reactive power is increased. Knowing the current capacity of the line-side converter 368 for the full power conversion system, the capacity range for injecting negative sequence current and positive sequence current into the grid 384 can be determined. The user may choose for setting aspects of the current injection within the range and according to the preference or need.

One skilled in the art will recognize that techniques for current compensation 500 may be deployed in a variety of ways. For example, current compensation 500 may be governed by operation of software or firmware. Typically, the software and firmware are implemented in the controller 374 to provide for rapid adjustment of the wind turbine system 350. However, this is merely illustrative and not limiting of the embodiments disclosed herein.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for modifying an effect of a disturbance in an electric grid on a generator coupled to the grid, the method comprising:

tracking at least a negative sequence component and a positive sequence component of a signal of the electric grid;

orienting a voltage derived from at least a portion of the magnitude of the negative sequence component for injecting a current into the electric grid; and, injecting the current into the electric grid to modify the disturbance.

2. The method as in claim 1, wherein each of the negative sequence component and the positive sequence component comprise phase information, frequency information and magnitude information.

3. The method as in claim 1, wherein the tracking comprises detecting the grid disturbance.

4. The method as in claim 1 further comprising obtaining parameters of at least one of the electric grid, the generator and a control system for the generator before the injecting.

5. The method as in claim 1, wherein modifying the effect comprises increasing small signal linearity for at least one of a positive sequence grid condition and a negative sequence grid condition.

6. The method as in claim 1, wherein the effect comprises an effect upon at least one of a steady-state condition and a transient condition.

7. The method as in claim 1, wherein modifying comprises reducing actuation of system protection features.

8. The method as in claim 1, wherein the at least a portion is within a predetermined range.

9. The method as in claim 1, wherein the voltage derived from at least a portion of the magnitude of the negative sequence component is oriented for maximizing at least one of the active power injection and the reactive power injection.

10. The method as in claim 1, wherein the injecting the current comprises emulating a synchronous generator connected to the electric grid.

11. The method as in claim 1, wherein the injecting reduces the amount of asymmetric voltage in the grid current.

12. The method as in claim 1, wherein the modifying comprises modifying the apparent impedance of at least one of the generator, the positive sequence component, the negative sequence component and a harmonic frequency of the signal.

13. An apparatus for modifying an effect of a disturbance in an electric grid on a generator coupled to the grid, the apparatus comprising:

a controller for tracking at least a negative sequence component and a positive sequence component of a signal of the electric grid, orienting a voltage derived from at least a portion of the magnitude of the negative sequence component for injecting a current into the electric grid; and, injecting the current into the electric grid to modify the disturbance.

14. A computer program product stored on machine readable media, the product comprising instructions for modifying an effect of a disturbance in an electric grid on a generator coupled to the grid, by:

tracking at least a negative sequence component and a positive sequence component of a signal of the electric grid;

orienting a voltage derived from at least a portion of the magnitude of the negative sequence component for injecting a current into the electric grid; and, injecting the current into the electric grid to modify the disturbance.

15. The computer program product as in claim 14, wherein the tracking comprises detecting the grid disturbance.

16. The computer program product as in claim 14 further comprising instructions for using parameters of at least one of the electric grid, the generator and a control system for the generator before the injecting.

17. The computer program product as in claim 14, wherein injecting comprises extending small signal linearity for at least one of the negative sequence component and the positive sequence component.

18. The computer program product as in claim 14, wherein the effect comprises an effect upon at least one of a steady-state condition and a transient condition.

19. The computer program product as in claim 14, wherein modifying comprises reducing actuation of system protection features.

20. The computer program product as in claim 14, wherein the at least a portion is within a predetermined range.

* * * * *